G. H. COATES.
COUPLING FOR SHAFTS.
APPLICATION FILED MAR. 29, 1917.
1,286,945.
Patented Dec. 10, 1918.
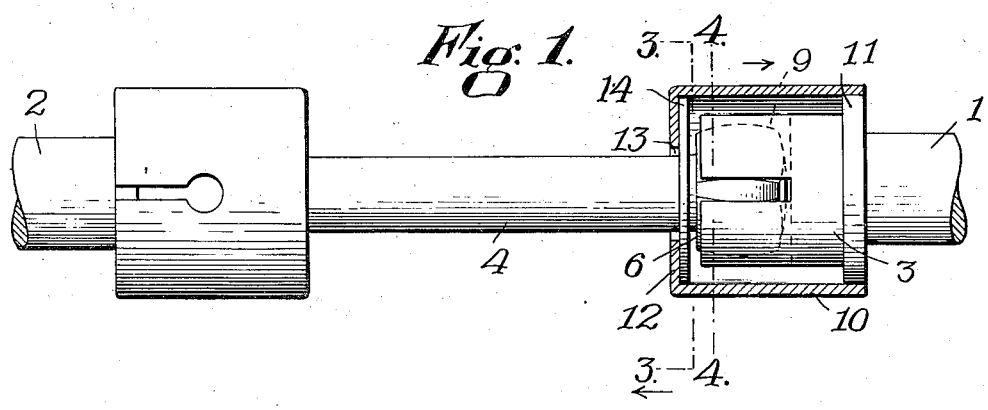
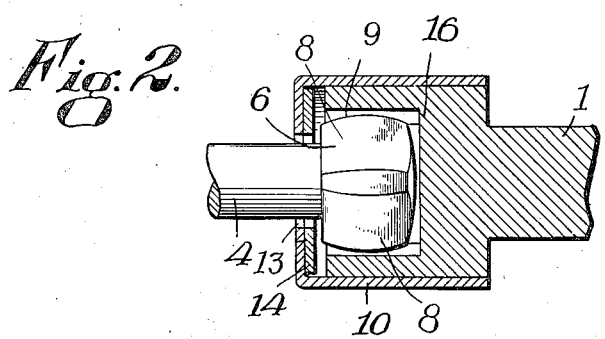
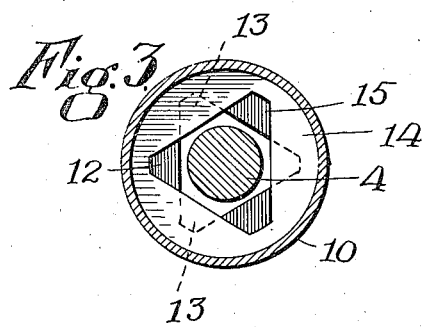
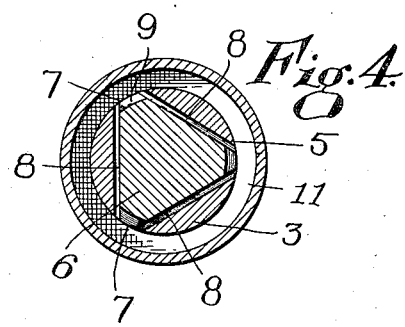
Inventor
George H. Coates.
By Fowler & Kennedy
Attorney

UNITED STATES PATENT OFFICE.

GEORGE H. COATES, OF WORCESTER, MASSACHUSETTS.

COUPLING FOR SHAFTS.

1,286,945.  Specification of Letters Patent.  Patented Dec. 10, 1918.

Application filed March 29, 1917. Serial No. 158,391.

*To all whom it may concern:*

Be it known that I, GEORGE H. COATES, a citizen of the United States, residing at Worcester, in the county of Worcester and Commonwealth of Massachusetts, have invented a new and useful Improvement in Couplings for Shafts, of which the following, together with the accompanying drawings, is a specification.

The present invention relates to a coupling for shafts, and more particularly to such a coupling which is designed to allow the shafts which it connects to have their axes moved out of alinement. The invention resides in the construction of a coupling of this class, adapted to have a limited universal action, and at the same time readily capable of manufacture at a small cost.

The invention is more fully set forth in the following description, reference being had in this connection to the accompanying illustrative drawings, in which—

Figure 1 is a view partly in section, showing the application of a coupling embodying my invention to the connection of a pair of rotatable shafts.

Fig. 2 is a fragmentary sectional view illustrating a slight modification of the coupling which is shown in section in Fig. 1.

Fig. 3 is a cross sectional view on the line 3—3, Fig. 1.

Fig. 4 is a cross sectional view on the line 4—4, Fig. 1.

Like reference characters refer to like parts in the different figures.

I have shown my invention, in Fig. 1, in the form of a double coupling, adapted to connect the shafts 1 and 2, which are spaced apart at their ends. Such showing, however, is merely illustrative, for it will be clear that the invention resides wholly in the construction of the coupling instrumentalities themselves, irrespective of the manner in which they are used with the shafting which is to be connected.

Each shaft 1, 2 is formed on its end with an enlargement 3, which, in the manner hereinafter described, is employed to connect said shaft with the adjacent end of a coupling shaft 4, interposed between shafts 1 and 2. Since the construction at each end of the coupling shaft 4 is identical, it will be sufficient to describe only the connection of said coupling shaft with the enlargement 3 of shaft 1, as shown partially in section in Fig. 1.

The end of enlargement 3 is formed with a recess 5 of triangular cross section, said recess having straight plane walls which extend inwardly a sufficient distance to inclose a similarly shaped enlargement 6 on the corresponding end of coupling shaft 4. In the form of device shown in Fig. 1 the straight inner walls of recess 5 intersect the outer periphery of enlargement 3, as shown in Fig. 4, the points of intersection of adjacent walls being spaced apart to provide longitudinal slots 7, three in number, in said enlargement, which communicate with said recess 5.

The enlargement 6 on the end of coupling shaft 4 is substantially triangular in cross section, to correspond with the recess 5, and the intersections of the adjacent surfaces 8, 8, 8, are flattened off, as shown at 9, to correspond with the slots 7 of enlargement 3. Each surface 8 of enlargement 6 is given a curvature in the direction of the axis of coupling shaft 4, so that the cross section of said enlargement is greatest at its central longitudinal portion, and becomes gradually less toward its outer and inner ends. The flattened portions 9, 9, are likewise curved in a longitudinal direction, and as a result of the curvature of surfaces 8, said flattened portions grow progressively thinner near their ends, being thickest at their centers. The cross section of enlargement 6 at its central portion, is such as to fit snugly within the recess 5 of enlargement 3, the adjacent walls and surfaces being substantially in line contact throughout. However, owing to the curvature of surfaces 8, and to the flatness of the inner walls of recess 5 the enlargement 6 is capable of a rocking movement within said recess in all directions, since said surfaces and walls can only make contact on straight lines. Obviously, the amount of rocking movement is dependent on the radius of curvature employed; if the curvature of surfaces 8 is on a large radius, so that said surfaces are almost flat, then very little rocking movement is possible. If, on the other hand, the curvature is on a small radius, the angular divergence between the axes of shafts 1 and 4 can become appreciably greater.

As a means for retaining enlargement 6 within recess 5, and also for excluding dust and dirt from the coupling thus formed, I may provide a housing or shell 10, one end of which is pressed or otherwise attached to a shoulder 11 on enlargement 3. The other end of said housing has an inturned portion 12 surrounding a triangular opening 13 of substantially the same configuration as enlargement 6, so as to permit the passage of the latter therethrough in assembling the coupling. Between the inturned portion 12 and the enlargement 6 is disposed a washer 14, having a triangular opening 15 therein to permit it to be slipped over said enlargement. When the parts are assembled, the washer 14 is so attached by pins or screws, not shown, to the inturned portion 12 that said opening 15 will stand at an angle to the enlargement 6, as shown in Fig. 3, with the angular portions of said opening interposed substantially midway between the corresponding angular portions of said enlargement. Thus the enlargement 6 is prevented from being pulled out or displaced from recess 5.

In the modification shown in Fig. 2, the construction above described is substantially duplicated in all respects, except that the enlargement 16, providing the recess, is of greater diameter, and makes a snug fit with the shell 10. The size of the enlargement 6 on coupling shaft 4 being the same as in Figs. 1, 3, and 4, it follows that the recess in enlargement 16 is the same size as the recess 5, and hence said recess is wholly inclosed by its walls, and does not communicate through any slots with the exterior surface of said enlargement. The operation of a coupling thus formed is precisely the same as previously described, the curvature of the surfaces of enlargement 6 permitting a limited universal movement between the two shafts. Obviously, the construction shown in Fig. 2, although more difficult to manufacture, on account of the complete inclosure of the recess, is nevertheless stronger than the construction shown in Figs. 1, 3 and 4, on account of the unbroken character of the enlargement 16. The construction shown in Figs. 1 and 4 is preferable, as the openings or slots 7 enable the flat sides of the recess 5 to be finished by a thin rotating milling tool which can be passed through the slots 7, thereby reducing the expense and enabling the size of the recess to be accurately determined.

I claim:

1. In a coupling of the class described, a recessed member, a second member providing an enlargement of angular cross section for reception in said recess, to constrain the rotation of said members in unison, a shell attached to said recessed member, and providing an inturned retaining wall for said enlargement, with an angular opening therein corresponding to the cross section of said enlargement, and a washer having a similar opening, interposed between said wall and said enlargement, with the opening of said washer offset angularly from the opening of said wall.

2. In a coupling of the class described, a member having an angular recess provided with flat sides and having slots or openings at the intersection of said sides, and a second member of angular cross section for reception in said recess, with the sides of said second member longitudinally curved to allow a rocking movement of said second member in the recess.

3. In a coupling of the class described, a shaft having an enlargement at its end provided with a triangular recess having flat sides and slots in said enlargement at the intersection of said sides, and a second shaft having a triangular enlargement at its end with curved sides for reception in said recess and having longitudinally curved surfaces opposite said slots.

4. In a coupling of the class described, a pair of shafts, each having an enlargement at its end provided with an angular recess with flat sides, an intermediate shaft having an angular enlargement at its opposite ends with curved sides inclosed in said recesses, and means for preventing the withdrawal of said intermediate shaft from said recesses.

GEORGE H. COATES.

Witnesses:
PENELOPE COMBERBACH,
NELLIE WHALEN.